US009038100B2

(12) United States Patent
Zalewski et al.

(10) Patent No.: US 9,038,100 B2
(45) Date of Patent: *May 19, 2015

(54) DYNAMIC INSERTION OF CINEMATIC STAGE PROPS IN PROGRAM CONTENT

(71) Applicant: Sony Computer Entertainment America LLC, San Mateo, CA (US)

(72) Inventors: Gary Zalewski, Piedmont, CA (US); Riley R. Russell, San Mateo, CA (US)

(73) Assignee: Sony Computer Entertainment America LLC, San Mateo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/030,958

(22) Filed: Sep. 18, 2013

(65) Prior Publication Data

US 2014/0040944 A1 Feb. 6, 2014

Related U.S. Application Data

(63) Continuation of application No. 11/371,215, filed on Mar. 7, 2006, now Pat. No. 8,566,865.

(51) Int. Cl.
*H04N 7/10* (2006.01)
*H04N 7/025* (2006.01)
*H04N 21/81* (2011.01)
(Continued)

(52) U.S. Cl.
CPC ............ *H04N 21/812* (2013.01); *G06Q 30/02* (2013.01); *G11B 27/036* (2013.01); *H04N 21/478* (2013.01)

(58) Field of Classification Search
CPC .................................................. H04N 21/812
USPC ...................................................... 725/32–36
See application file for complete search history.

(56) References Cited

U.S. PATENT DOCUMENTS 5,099,322 A  3/1992  Gove
5,953,076 A  9/1999  Astle
(Continued)

FOREIGN PATENT DOCUMENTS

EP  1168210 A1  1/2002
EP  1416727 A1  5/2004
(Continued)

OTHER PUBLICATIONS

USPTO; Unpublished U.S. Appl. No. 14/175,996, filed Feb. 7, 2014.
(Continued)

*Primary Examiner* — Hunter B Lonsberry
(74) *Attorney, Agent, or Firm* — Fitch, Even, Tabin & Flannery, LLP

(57) ABSTRACT

Dynamically replaceable assets are inserted in program content and may be used for the insertion of cinematic stage props therein. Such assets can be used for advertising purposes in that images of different products and services can be inserted therein and are changeable via a network. Such assets may be created by identifying locations in the content where the assets can be inserted, establishing the assets in the identified locations, and determining location and visual effects information for each asset. Replacement images, such as images of products, may be obtained via a network. The visual appearance of each replacement image may be modified using visual effects information so the inserted objects appear natural as if they were part of the original scene.

34 Claims, 11 Drawing Sheets

(51) Int. Cl.
  *G06Q 30/02*  (2012.01)
  *G11B 27/036*  (2006.01)
  *H04N 21/478*  (2011.01)

(56) References Cited

U.S. PATENT DOCUMENTS

| | | | |
|---|---|---|---|
| 6,297,853 | B1 | 10/2001 | Sharir |
| 6,373,508 | B1 | 4/2002 | Moengen |
| 6,624,853 | B1 | 9/2003 | Latypov |
| 6,954,498 | B1 | 10/2005 | Lipton |
| 7,015,978 | B2 | 3/2006 | Jeffers |
| 7,020,381 | B1 | 3/2006 | Kato |
| 8,151,295 | B1 | 4/2012 | Eldering |
| 8,451,380 | B2 | 5/2013 | Zalewski |
| 8,549,554 | B2 | 10/2013 | Zalewski |
| 8,566,865 | B2 * | 10/2013 | Zalewski et al. ............... 725/34 |
| 8,665,373 | B2 | 3/2014 | Zalewski |
| 8,860,803 | B2 | 10/2014 | Zalewski et al. |
| 2002/0002525 | A1 | 1/2002 | Arai |
| 2002/0027617 | A1 | 3/2002 | Jeffers |
| 2002/0044683 | A1 | 4/2002 | Deshpande |
| 2002/0083439 | A1 | 6/2002 | Eldering |
| 2002/0100042 | A1 | 7/2002 | Khoo |
| 2002/0112249 | A1 | 8/2002 | Hendricks |
| 2003/0028432 | A1 | 2/2003 | Troyansky |
| 2003/0028873 | A1 | 2/2003 | Lemmons |
| 2004/0098753 | A1 | 5/2004 | Reynolds |
| 2004/0193488 | A1 | 9/2004 | Khoo |
| 2004/0194128 | A1 | 9/2004 | McIntyre |
| 2005/0137958 | A1 | 6/2005 | Huber |
| 2006/0155615 | A1 | 7/2006 | Loo |
| 2007/0055986 | A1 | 3/2007 | Gilley |
| 2007/0197287 | A1 | 8/2007 | Shimizu |
| 2007/0214476 | A1 | 9/2007 | Zalewski |
| 2007/0220553 | A1 | 9/2007 | Branam |
| 2007/0226761 | A1 | 9/2007 | Zalewski |
| 2007/0279494 | A1 | 12/2007 | Aman |
| 2008/0231751 | A1 | 9/2008 | Zalewski |
| 2010/0228421 | A1 | 9/2010 | DiBernardo |
| 2011/0145856 | A1 | 6/2011 | Agarwal |
| 2012/0005595 | A1 | 1/2012 | Gavade et al. |
| 2013/0242195 | A1 | 9/2013 | Zalewski |
| 2014/0043364 | A1 | 2/2014 | Zalewski |
| 2014/0130084 | A1 | 5/2014 | Zalewski |
| 2014/0156364 | A1 | 6/2014 | Zalewski |

FOREIGN PATENT DOCUMENTS

| | | | |
|---|---|---|---|
| EP | 1463317 | A2 | 9/2004 |
| JP | 2004304792 | A | 10/2004 |
| JP | 2007530978 | A | 11/2007 |
| WO | 9703517 | A1 | 1/1997 |
| WO | 2005076598 | A1 | 8/2005 |

OTHER PUBLICATIONS

USPTO; Restriction Requirement issued in U.S. Appl. No. 14/151,536, mailed May 5, 2014, 6 pages.
USPTO; Office Action issued in U.S. Appl. No. 14/026,948, mailed Dec. 11, 2013, 9 pages.
European Patent Office; "Communication pursuant to Article 94(3) EPC" issued in European Patent Application No. 12179714.6, dated Jan. 7, 2014, 4 pages.
USPTO; Unpublished U.S. Appl. No. 14/151,536, filed Jan. 9, 2014.
Chinese Patent Office, 'Third Office Action' issued in Chinese Patent Application No. 200780016668.3 dated Jan. 31, 2012, 31 pages.
Chinese Patent Office; 'Decision of Rejection' issued in Chinese Patent Application No. 200780016668.3, dated Sep. 5, 2012, 38 pages. (includes English translation).
Chinese Patent Office; 'Decision on Rejection' issued in Chinese Patent Application No. 200880009256.1, dated Dec. 5, 2012 (includes English translation), 15 pages.
Chinese Patent Office; 'First Office Action' issued in Chinese Application No. 2007.80016668.3; issued Feb. 12, 2010, 31 pages.
Chinese Patent Office; 'First Office Action' issued in Chinese Patent Application No. 200880009256.1 dated Jun. 5, 2012 (includes English translation), 13 pages.
Chinese Patent Office; 'Fourth Office Action' issued in Chinese Patent Application No. 200780016668.3, dated May 15, 2012, 35 pages (includes English translation).
Chinese Patent Office; 'Second Office Action' issued in Chinese Application No. 2007.80016668.3; dated Mar. 2, 2011, 21 pages.
European Patent Office, Communication pursuant to Article 94(3) EPC' issued in European Patent Application No. 08018364.3 dated Jan. 2, 2012, 7 pages.
European Patent Office, Communication pursuant to Article 94(3) EPC issued in European Application No. 07757929 dated Dec. 5, 2011 (6 pages).
European Patent Office; 'Communication Pursuant to Article 94(3) EPC' issued in European Application No. EP 07 757 929.0 for PCT/US2007/063326; dated Aug. 11, 2010; 1 page.
European Patent Office; 'Communication under Rule 71(3) EPC' issued in European Patent Application No. 08018364.3 dated Jun. 25, 2012, 50 pages.
European Patent Office; 'Decision to grant a European Patent pursuant to Article 97 (1) EPC' issued in European Patent Application No. 08018364.3, mailed Nov. 2, 2012, 2 pages.
European Patent Office; 'European Search Report' issued in European Publication No. EP 2046043A3 for EP Application No. 08018364.3; dated Mar. 30, 2010; 3 pages.
European Patent Office; 'Extended European Search Report' issued in European Patent Application No. 12179714.6, mailed Sep. 28, 2012, 8 pages.
European Patent Office; 'Extended European Search Report (including the Supplementary European Search Report and the European Search Opinion)' issued in European Application No. EP 07 757 929.0 for PCT/US2007/063326; dated Apr. 9, 2010; 7 pages.
European Patent Office; 'Extended European Search Report (including the Supplementary European Search Report and the European Search Opinion)' issued in European Application No. EP 08 01 8364.3; dated Apr. 9, 2010; 8 pages.
Japanese Patent Office; 'Decision of Refusal' issued in Japanese Patent Application No. 2008-558491, dated Sep. 25, 2012, 4 pages (includes English translation).
Japanese Patent Office; 'Notification of Reason(s) for Refusal' issued in Japanese Application No. 2008-558491; dated Nov. 15, 2011; 6 pages (including English translation).
Japanese Patent Office; 'Notification of Reasons for Refusal' issued in Japanese Patent Application No. 2012-055357, dated Apr. 16, 2013, 5 pages (includes English translation).
Japanese Patent Office; "Final Notification of Reasons for Refusal" issued in Japanese Patent Application No. 2012-055357, dated Aug. 6, 2013, 4 pages (includes English translation).
Japanese Patent Office; "Final Notification of Reasons for Refusal" issued in Japanese Patent Application No. 2012-055358, dated Aug. 6, 2013, 4 pages (includes English translation).
Japanese Patent Office; "Notification of Reasons for Refusal" issued in Japanese Patent Application No. 2012-055358, dated Apr. 16, 2013, 4 pages (includes English translation).
Japanese Patent Office; Notification of Reasons for Refusal issued in Japanese Patent Application No. 2008-558491; dated May 15, 2012; 4 pages (includes English translation).
Patent Cooperation Treaty; 'International Preliminary Report on Patentability' issued in PCT/ US07/63326; dated Oct. 21, 2008; 8 pages.
Patent Cooperation Treaty; 'International Search Report' issued in PCT/ US07/63326; mailed Sep. 3, 2008; 2 pages.
Patent Cooperation Treaty; 'International Search Report' issued in PCT Application No. PCT/ US2008/057373, dated May 26, 2008; 2 pages.
Patent Cooperation Treaty; 'Notification of Transmittal of the International Search Report and the Written Opinion of the International Searching Authority or Declaration' issued in PCT/US07/63326; mailed Sep. 3, 2008; 2 pages.
Patent Cooperation Treaty; 'Notification of Transmittal of the International Search Report and the Written Opinion of the International Searching Authority or the Declaration' issued in PCT Application No. PCT/US2008/057373, dated Jul. 1, 2008; 2 pages.

(56) References Cited

OTHER PUBLICATIONS

Patent Cooperation Treaty; 'Written Opinion of the International Searching Authority' issued in PCT/US07/63326; mailed Sep. 3, 2008; 7 pages.
Patent Cooperation Treaty; 'Written Opinion of the International Searching Authority' issued in PCT Application No. PCT/US2008/057373, dated May 26, 2008; 7 pages.
Patent Cooperation Treaty; "International Preliminary Report on Patentability" issued in PCT/US2008/057373; dated Sep. 22, 2009; 6 pages.
USPTO, Final Office Action issued in U.S. Appl. No. 11/689,982, mailed Dec. 9, 2011, 11 pages.
USPTO, Office Action issued in U.S. Appl. No. 11/371,367 mailed Mar. 22, 2012, 15 pages.
USPTO; 'Non-final Office Action, Supplemental' issued in U.S. Appl. No. 11/371,367, mailed Jul. 29, 2008; 13 pages.
USPTO; Advisory Action issued in U.S. Appl. No. 11/371,215, mailed Jun. 19, 2009; 3 pages.
USPTO; Advisory Action issued in U.S. Appl. No. 11/689,982, mailed Feb. 27, 2012, 3 pages.
USPTO; Applicant-Initiated Interview Summary issued in U.S. Appl. No. 11/689,982, mailed Dec. 14, 2012, 5 pages.
USPTO; Final Office Action issued in U.S. Appl. No. 11/371,215, mailed Apr. 5, 2012,13 pages.
USPTO; Final Office Action issued in U.S. Appl. No. 11/371,215, mailed Mar. 4, 2009; 11 pages.
USPTO; Final Office Action issued in U.S. Appl. No. 11/371,367, mailed Oct. 11, 2012, 6 pages.
USPTO; Final Office Action issued in U.S. Appl. No. 11/371,367; dated Mar. 16, 2010, 12 pages.
USPTO; Final Office Action issued in U.S. Appl. No. 11/371,367; mailed Feb. 2, 2009; 16 pages.
USPTO; Final Office Action issued in U.S. Appl. No. 11/689,982, mailed Oct. 16, 2012, 15 pages.
USPTO; Interview Summary issued in U.S. Appl. No. 11/371,367; mailed Oct. 27, 2008; 2 pages.
USPTO; Notice of Allowance & Examiner-Initiated Interview Summary issued in U.S. Appl. No. 13/891,095, mailed Oct. 7, 2013, 21 pages.
USPTO; Notice of Allowance issued in U.S. Appl. No. 11/371,215, mailed Jun. 13, 2013, 8 pages.
USPTO; Notice of Allowance issued in U.S. Appl. No. 11/371,367, mailed Jan. 15, 2013, 5 pages.
USPTO; Notice of Allowance issued in U.S. Appl. No. 11/371,367, mailed May 28, 2013, 6 pages.
USPTO; Notice of Allowance issued in U.S. Appl. No. 11/689,982, mailed Jan. 31, 2013,14 pages.
USPTO; Office Action issued in U.S. Appl. No. 11/371,367; mailed Jul. 27, 2009; 9 pages.
USPTO; Office Action issued in U.S. Appl. No. 11/371,215, mailed Sep. 10, 2008; 11 pages.
USPTO; Office Action issued in U.S. Appl. No. 11/371,215, mailed Sep. 10, 2009; 10 pages.
USPTO; Office Action issued in U.S. Appl. No. 11/371,215; mailed Jul. 22, 2011, 12 pages.
USPTO; Office Action issued in U.S. Appl. No. 11/371,215; mailed Mar. 29, 2010, 10 pages.
USPTO; Office Action issued in U.S. Appl. No. 11/689,982, mailed Apr. 5, 2012, 15 pages.
USPTO; Office Action issued in U.S. Appl. No. 11/689,982; mailed Jun. 20, 2011, 14 pages.
USPTO; Office Action issued in U.S. Appl. No. 11/371,367; dated Jul. 20, 2011; 12 pages.
USPTO; Office Action issued in U.S. Appl. No. 11/371,367 dated Jul. 16, 2008; 13 pages.
USPTO; Pending Unpublished US Patent Application by Zalewski, Gary et al.; U.S. Appl. No. 14/026,948, filed Sep. 13, 2013, entitled "Dynamic Replacement of Cinematic Stage Props in Program Content", 44 pages, which includes the application abstract, specification, claims, and drawings.
Wang, Yang et al. 'Estimation of multiple directional light sources for synthesis of augmented reality images.' CS Dep't, SUNY Stony Brook, 2003. http://www.cs.sunysb.edU/vislab/wordpress//papers/GM2003.pdf.
USPTO; Notice of Allowance & Examiner-Initiated Interview Summary issued in U.S. Appl. No. 14/026,948, mailed Jun. 11, 2014, 8 pages.
USPTO; Office Action issued in U.S. Appl. No. 14/151,536, mailed Jul. 17, 2014, 12 pages.
USPTO; Restriction Requirement issued in U.S. Appl. No. 14/175,996, mailed Jul. 7, 2014, 6 pages.
European Patent Office; "Summons to Attend Oral Proceedings Pursuant to Rule 115(1) EPC" issued in European Patent Application No. 07757929.0, dated Feb. 20, 2014, 8 pages.
European Patent Office; "Decision to refuse a European Patent application" issued in European Patent Application No. 07757929.0, dated Oct. 16, 2014, 21 pages.
USPTO; Notice of Allowance & Examiner-Initiated Interview Summary issued in U.S. Appl. No. 14/175,996, mailed Oct. 16, 2014, 18 pages.
USPTO; Unpublished U.S. Appl. No. 14/508,723, filed Oct. 7, 2014.
Chinese Patent Office; 'First Office Action' issued in corresponding Chinese Patent Application No. 201210557696.9, dated Dec. 24, 2014, 8 pages.
European Patent Office; "Communication under Rule 71(3) EPC" issued in corresponding European Patent Application No. 12179714.6, dated Mar. 11, 2015, 39 pages.

\* cited by examiner

US 9,038,100 B2

DYNAMIC INSERTION OF CINEMATIC STAGE PROPS IN PROGRAM CONTENT

CROSS-REFERENCE TO RELATED APPLICATIONS

This application is a continuation of U.S. patent application Ser. No. 11/371,215, filed Mar. 7, 2006, entitled "DYNAMIC INSERTION OF CINEMATIC STAGE PROPS IN PROGRAM CONTENT," the entire disclosure of which is hereby fully incorporated by reference herein in its entirety.

This application is related to U.S. patent application Ser. No. 11/371,367, filed Mar. 7, 2006, entitled "DYNAMIC REPLACEMENT OF CINEMATIC STAGE PROPS IN PROGRAM CONTENT," also by inventors Gary Zalewski and Riley R. Russell, the entire disclosure of which is incorporated herein by reference.

BACKGROUND OF THE INVENTION

1. Field of the Invention

The present invention relates generally to digital video processing, and more specifically to digital insertion of images in program content for use in advertising.

2. Discussion of the Related Art

One traditional form of advertising is the television commercial. Such television commercials typically consist of brief advertising spots that range in length from a few seconds to several minutes. The commercials appear between shows and interrupt the shows at regular intervals. The goal of advertisers is to keep the viewer's attention focused on the commercial, but often times the viewer will change the channel during the commercial to avoid watching the commercial.

Another way that viewers have avoided television commercials is by using digital video recorders (DVRs). With a DVR a person can record a show and then fast forward through the commercials during playback. Other media players are expected to provide viewers with even greater ability to track and skip commercials.

It is with respect to these and other background information factors that the present invention has evolved.

SUMMARY OF THE INVENTION

The present invention advantageously addresses the needs above as well as other needs by providing a method for use in modifying program content. The method comprises the steps of: identifying locations in the content where dynamically replaceable assets can be inserted; establishing dynamically replaceable assets in one or more of the identified locations in the content; determining location information for each established dynamically replaceable asset; determining visual effects information associated with each established dynamically replaceable asset; and creating a reference file that includes the location and the visual effects information associated with each established dynamically replaceable asset.

Another embodiment of the present invention provides a system for modifying program content. The system comprises: means for identifying locations in the content where dynamically replaceable assets can be inserted; means for establishing dynamically replaceable assets in one or more of the identified locations in the content; means for determining location information for each established dynamically replaceable asset; means for determining visual effects information associated with each established dynamically replaceable asset; and means for creating a reference file that includes the location and the visual effects information associated with each established dynamically replaceable asset.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION

Figure 1A:
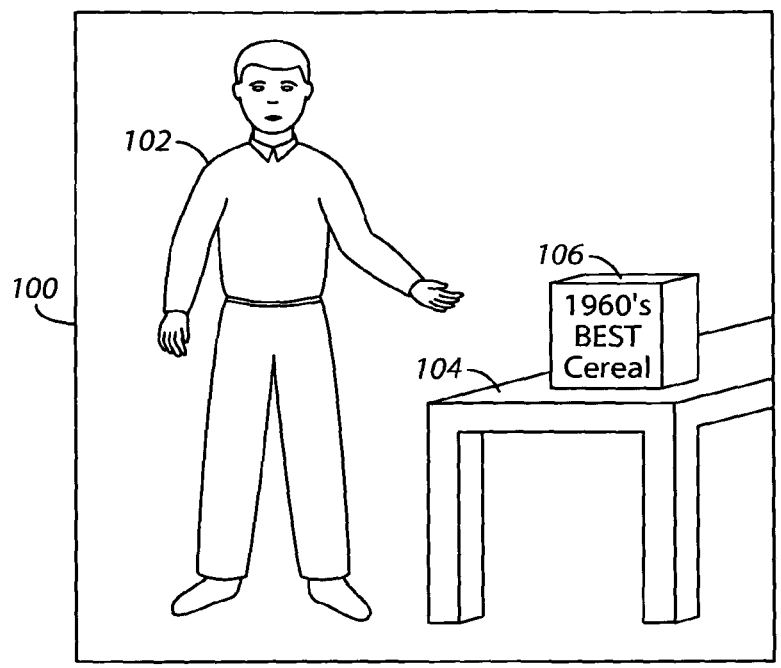
FIGS. 1A, 1B, 1C, and 1D are pictorial diagrams illustrating examples of dynamically replaceable stage props/assets in accordance with embodiments of the present invention.

When viewers avoid traditional television commercials as described above, the advertisers' messages are not received by the viewers, which is disadvantageous. Because of such disadvantages, embodiments of the present invention involve the use of advertising in the television show or other content itself.

Embodiments of the present invention involve the replacement/substitution of product placement advertisements in the content itself. That is, the content includes one or more assets, which are locations in the video where images of different products can be inserted. For example, a cereal box that appears in an episode of a certain television show can be replaced with a different brand cereal box. Typically, the company that sells the inserted cereal will pay for this asset since it is a form of advertising. In this way each time the episode of the show is aired the asset can be sold to the same or a different advertiser.

As will be described below, such assets can be identified in legacy programs. That is, many older television programs and movies include products and other stage props that may be outdated, no longer exist, be provided by companies that no longer exist, etc. Many such older programs get replayed over and over again through reruns. Embodiments of the present invention provide methods for identifying the fixed stage props in these legacy programs and converting them into dynamically replaceable props that become valuable assets. This way, each time the program is rerun an image of a current product or service can be inserted into the asset, which can be used to generate advertising revenue.

In other embodiments of the present invention new program content is developed with such advertising assets in mind from the beginning. This allows for the content to be developed to provide appropriate strategic positioning and sizing of the assets. For example, a motion picture company can work closely with advertising experts in developing the assets during production of the motion picture.

In still other embodiments of the present invention new digital props/assets are inserted into legacy programs where no fixed prop previously existed. That is, new props are added, such as for example pictures on blank walls where the pictures contain some ad-affinity, brand, etc. Such embodiments help to solve the issue where legacy content may have limited opportunity for product/stage prop replacement. Thus, for example, there is no need to replace a cereal box when one can be added into the scene.

Once the content has been modified or developed to include the dynamically replaceable advertising assets, the images of various different products and services can be changeable over a network.

Identifying Assets in Legacy Content:

Legacy content includes content that was produced in the past, perhaps years earlier. For legacy content, the first part of the process is to go through it and identify the assets that can be replaced. For example, such assets can include, but are not limited to, cereal boxes, soda cans and bottles, pizza boxes, other product boxes, cartons, containers, services, etc. The assets can include anything where a different texture, bitmap image, video stream, jpeg image, etc., of a different brand can be overlaid onto the existing object.

Referring to FIGS. 1A, 1B, 1C, and 1D, there is illustrated an example of how a fixed stage prop can be identified in legacy content and then replaced with a dynamically replaceable asset. Specifically, in FIG. 1A a scene 100 in a legacy program may include a character 102 standing next to a table 104. On the table 104 may be a fixed stage prop such as a box of cereal of a certain brand, such as for example the "1960s BEST Cereal" 106 that is shown. Because the "1960s BEST Cereal" 106 may be outdated and no longer available, it is desirable to replace it with a currently available product. Doing so would increase the advertising value of that stage prop making it a valuable asset.

Figure 1B:
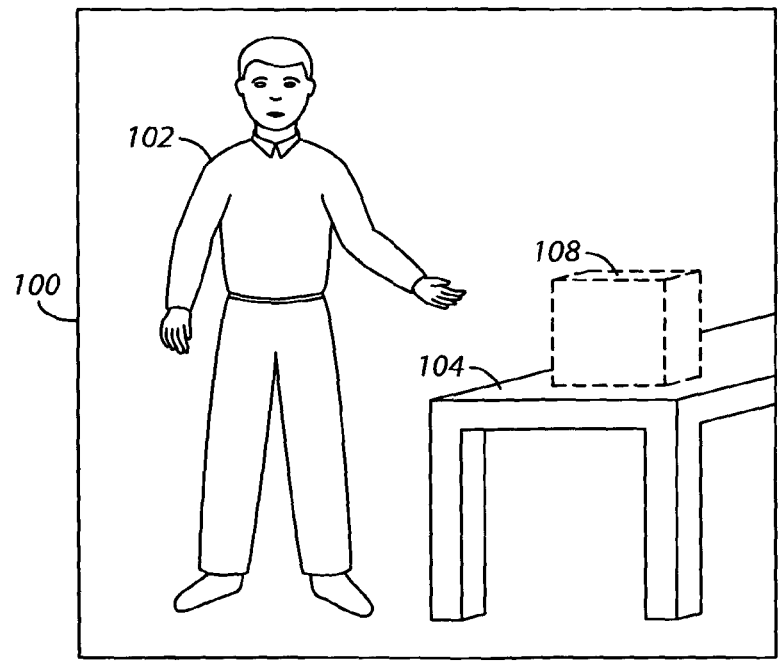

In FIG. 1B the "1960s BEST Cereal" 106 has been replaced in the scene 100 with a dynamically replaceable stage prop/asset 108. The dynamically replaceable stage prop/asset 108 comprises data that is inserted into the program content that allows different images of different products or services to be inserted into the scene to replace the previous stage prop. The new images of the different products or services are what will be seen by the viewer.

Figure 1C:
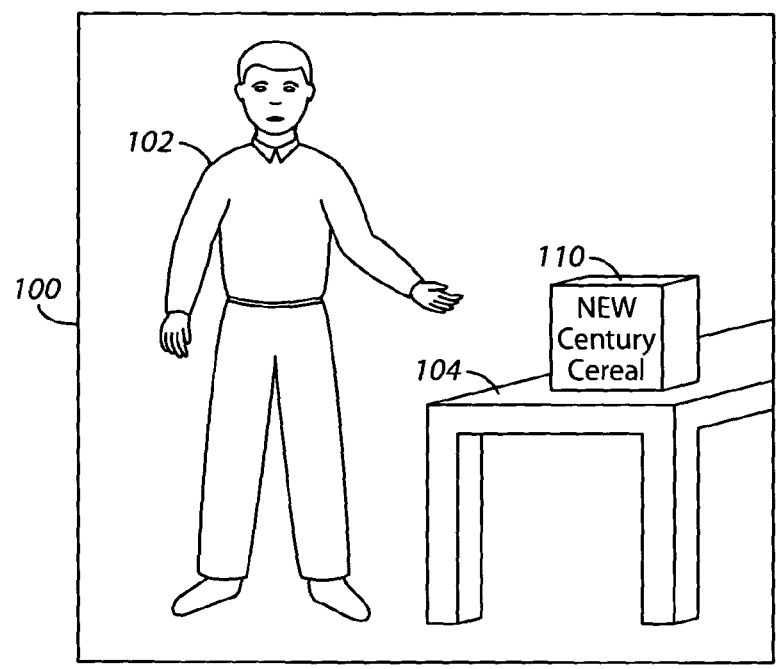
Figure 1D:
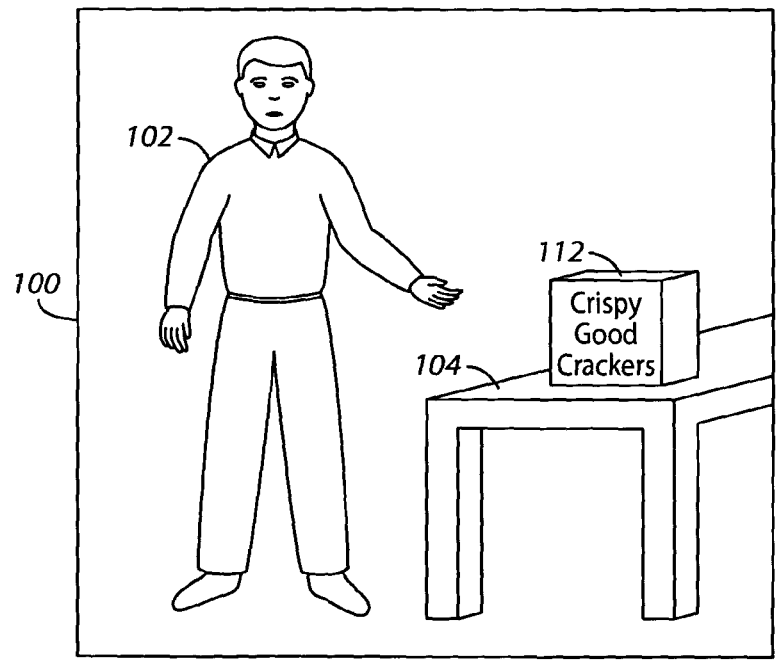

For example, in FIG. 1C a new and more modern brand of cereal called "NEW Century Cereal" 110 has been inserted into the asset 108 in the scene 100 to replace the "1960s BEST Cereal" 106. The program could be run for a period of time while the suppliers of "NEW Century Cereal" pay for this advertising opportunity. Then later, a different advertiser may want to pay to have their product displayed in the asset 108. For example, in FIG. 1D a different product altogether, namely "Crispy Good Crackers" 112, has been inserted into the asset 108 in the scene 100. The suppliers of "Crispy Good Crackers" may pay to have their product displayed for a certain period of time while the program is rerun, such as for example just one episode or possibly a whole season or more.

Figure 2A:
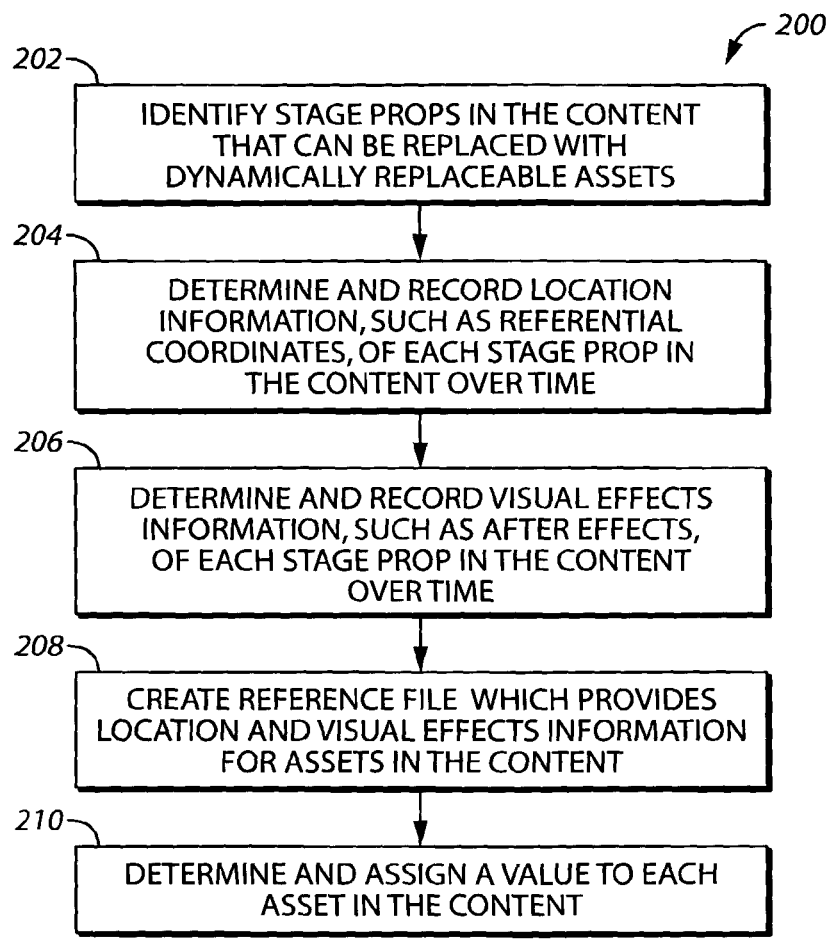
FIGS. 2A and 2B are flow diagrams illustrating methods for creating content with dynamically replaceable stage props/assets in accordance with embodiments of the present invention.

Referring to FIG. 2A, there is illustrated a method 200 of creating dynamically replaceable stage props/assets in accordance with an embodiment of the present invention. The method 200 begins in step 202 in which stage props are identified in the content. The stage props that are identified are those that can or those for which it would be advantageous to be replaced with dynamically replaceable assets.

Specifically, in accordance with some embodiments of the present invention, the process of identifying such stage props/assets may be performed manually by going through the content, i.e. on a frame-by-frame basis. With manual identification of the assets one goes through the content in a frame-by-frame or similar manner and identifies the assets. Nearly anything in the content may be used as an asset. For example, one might identify a pizza box or other product box or container that appears in the content as a stage prop.

In step 204 the referential coordinates or other location information of each stage prop/asset in the content are determined and recorded over time. That is, location information is determined for each identified stage prop that is to be replaced. For example, after an asset is identified, the content may be rewound back to the first instance of the asset. The asset is then zoomed in on and the referential coordinates of the asset are identified manually.

For example, one of the corners of the asset, such as a box, may be clicked on. Any corner may be clicked on, such as the upper left or lower right corner. An overlay region may then be identified for prop replacement in the perspective for the particular frame. Because the cameras are usually moving, one will typically manually go through each frame and plug in the coordinates that define the location of the box with respect to the camera.

The manual identification of the stage props/assets does not have to be done on a frame-by-frame basis. Namely, it can be done every other frame, every several frames, or nearly any number of frames. For example, the corners of the box can be identified in one frame and then many frames can be skipped until the position of the box changes. The frames can be skipped because the reference coordinates of the box will be the same as the previous frame.

Automated smoothing functions may be applied after manual identification process to assure that the insertion regions are bound properly and consistently, without jitter and with proper aspect ratios. Such smoothing functions may ensure that the present invention operates transparently to achieve the targeted psycho-visual experience for the end user. Other functions including those that result in jitter, strobing, halo, etc. may be applied to bring contrast or attention to the replacement prop.

In addition to tracking the referential coordinates identified for each stage prop/asset across frames, the idea, theme, concept, etc., associated with each asset may also be identified or designated. Scene information, such as light sources, diffusers, reflectors, etc., their types, locations, colors, intensities, etc. may be recorded in a time-based reference file. Other characteristics of each asset may also be identified or designated. This data is saved along with the coordinates.

All or some of the data may be used to develop a function that over the time the content is running provides appropriate referential coordinates of the location in the video of the asset so the replacement image can be calibrated to smooth the insertion of the replacement content into the media.

Determining After Effects in Legacy Content:

After the stage props/assets are identified, the after effects of the assets are then determined. Specifically, in step 206 the after effects or other visual effects information of each stage prop/asset in the content are determined and recorded over time. That is, visual effects information associated with each identified stage prop are determined. Such after effects or visual effects information may include rendering functions, variables and settings. After effects are applied according to scene information so the image psycho-visually complies with the scene environment in a proscribed manner. That is, the after effects of the original asset are determined so that the data can be used to make the replacement image, in most cases, fit in, blend with the scene and look natural.

Such after effects may include not only the coloring, shading, focus, sharpening, blurring aspect, etc., but also any other or all visual qualities that were applied to the original asset in order to match the optical qualities. Such visual qualities may, for example, include the luminescent, reflectivity, and/or shading qualities. Rendering settings are typically set to achieve visual qualities that reflect the environment of the real, original scene.

It is important to understand what after affects would have to be applied to an image to blur it or make it fit in with the original qualities of the asset being replaced. A profiling step may be used in which, for example, a soda bottle in the background is viewed to determine the magnitude of the blur level or the blur threshold.

A post filter may be used to try to match a new texture to give the optical quality of the original object. The optical quality will often change on a frame-by-frame basis. One way to check this is to check the optical quality of the asset in the first frame, and then check the optical quality of the asset in a later frame to confirm that it has the same blur level or same optical filter level. Different frames can be checked until the asset is no longer in the view of the camera.

One goal is to develop a function that over the time the content is running dictates what after effects or other visual effects information have to be applied to a new texture that is dynamically served into the content to replace a previously fixed stage prop when the content is played. Such after affects or other visual effects information may be determined over time that the content is running.

Automated Identification of Assets and After Effects in Legacy Content:

In accordance with other embodiments of the present invention, the processes of identifying assets and/or after effects of assets in legacy content may be at least partially automated. For example, a software tool that is designed for these tasks may be used. Namely, part of the process of processing a legacy video, television show, movie, or other content, could be a tool phase where a software tool is used to process the content.

Figure 2B:
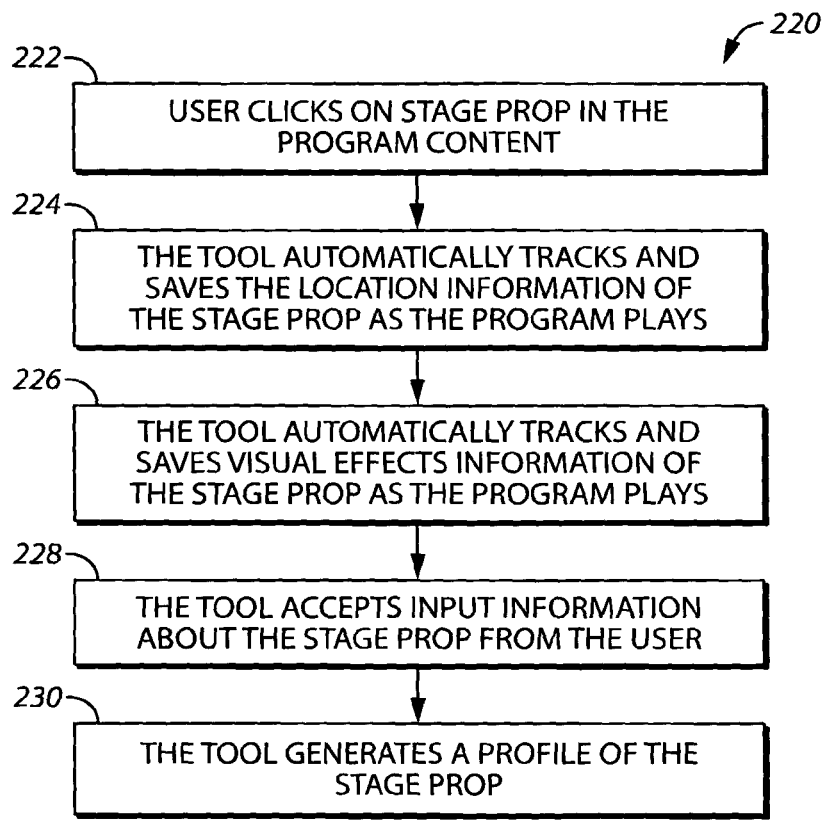

Referring to FIG. 2B, there is illustrated a method 220 that may be performed by such a tool in accordance with an embodiment of the present invention. In step 222 the user clicks on the stage prop in the content. That is, such a tool allows the user to click on the asset in the legacy content, such as a cereal box. The tool zooms in on the box and identifies the referential coordinates or other location information for the box. In step 224 the tool automatically tracks and saves the location information of the stage prop as the program content plays.

The tool may also be configured to determine the visual effects information associated with the box. In step 226, the tool automatically tracks and saves this information for the stage prop as it moves during the playing of the content.

Furthermore, in some embodiments of the present invention, the software tool also profiles the box. That is, after the box is clicked on, the tool makes a profile of it, and then the user can decide on shading, blur, etc.

The tool can be configured to accept input information about the box as part of the profiling process. Thus, in step 228 the tool accepts input information about the stage prop from the user. That is, the user can provide the tool with all the information the user has about the box in the legacy content. For example, the user can provide the tool with the type of box it is, i.e. the specific legacy product that was packaged in the box. The tool will look up the image for that specific box and will look at the pixel settings that represent the shading in that film environment. The tool will then be able to determine the general lighting principles associated with the particular bitmap image that it knows is in that location and orientation. The tool then uses all of this information to automatically do an analysis of the stage prop image and generate a profile, which is indicated by step 230.

The generated profile can indicate where the rendered asset should be shaded and where the light source should be positioned based on the camera view of the box. The profile may also include information for rendering the inserted object or predict a light source over the course of the changing camera environment. It can also show that the grading of the light is generally falling on the box in a particular pattern. The user can review all of the information in the profile and make adjustments.

The generated profile helps the user go through a calibration process for a legacy show to help find and determine all opportunities for dynamic replacement of legacy assets with advertising content.

Identifying Assets in New Content:

As was mentioned above, in other embodiments of the present invention new program content is developed with such dynamically replaceable cinematic stage props and advertising assets in mind from the beginning. This allows for the content to be developed to provide appropriate strategic positioning and sizing of the assets. For example, a motion picture company can work closely with advertising experts in developing the assets during production of the motion picture.

With new program content, the location of stage props, scene information and visual effects information such as after affects of the assets will already be known or can be captured during filming.

During film production a set of props can be used to automate the tracking of location of the prop and define the profile for the asset, based on scene information and the manipulation of the prop in the scene.

Passive or active props or a combination thereof may be used in the present invention.

Props are preferably but not necessarily shaped with a form factor to resemble the category of prop they represent (i.e. cereal box, soda can, cracker box, bottle, picture on wall, etc.).

Passive props may distinguish themselves from the scene environment to enable the present invention to automatically track the prop through a scene and in a manner that allows the system to record scene information that is reflected on the prop. Passive props may be made of green screen material, retro-reflective material combinations or suitable. Props may be encoded with visual markers, indexed visual markers or similar so the props can be referenced and tracked in the scene. For example, the X, Y, Z coordinates for the center of each of those props or the perimeter profile of the props can be tracked in an automated sense during analysis of the video frames with the present invention and matched with a definition of each of the props. Further processing may fit the prop tracking records with the profile of the prop to conform aspect ratios, smooth, etc.

Visual effects and after effects of the assets can be defined based on the known scene information, including time-based camera and prop positioning information. Given the scene information and determination of the position of the stage prop and the position of the camera, lights, etc. at any instant in time, the present invention has the appropriate inputs to compute appropriate after effect settings for the inserted stage prop.

Passive stage props may reduce or eliminate the need for the manual calibration process of going through the film frame-by-frame to identify the location of the asset tag. For example, a passive stage prop soda bottle i.e. made with retro-reflective markers is presented in the scene. As the soda bottle moves around in a character's hand, the time-based position information for the soda bottle is automatically determined by machine vision tracking methods known in the art and recorded. The position information may include orientation, tilt, yawl and roll metrics or suitable information to yield appropriate replacement regions for the soda prop/asset. Later, new props and/or replacement textures may be rendered into the frames where the soda bottle exists to effectively change the soda bottle from Coke® to Pepsi® or to a new brand that enters the market after the scene was produced.

In addition to passive props, active props may contain electronic circuits and systems that allow the prop to intelligently sense the environment in which they operate. Such sensors may enable global or local positioning capability and other sensors that record the environment in which the prop is exposed during a scene.

Such sensors may include but not be limited to, photodector(s), photodetector array(s), CCD sensor(s), CCD sensor array, accelerometer, etc.

Active props may record or transmit time based telemetry data that tracks the prop in the scene along with scene information and scene information directed at the prop including reflections, shadings, lightings, etc.

Active props may be tracked in a variety of ways, including their position, orientation, tilt, yawl, roll, etc. Props may also be tracked for deformations of form. Props may be tracked to understand how they are manipulated and deformed, so replacement objects comply with the same deformation. For example, a cereal box or toothpaste prop may be tracked to determined how its shape is deformed in the scene by the actor who may manipulate the prop by squeezed, opening, closing, accessing the prop, etc.

Active props can record or transmit time-based reflections of objects that reflect onto the prop. Reflection data and other sensor data is used to configure the after effect settings for the prop at the time-index of the video frame. When mixing the new textures on the prop, the new texture is rendered with the after effect settings so the new texture can appear on the prop object with actual reflections from the scene.

Thus, with new program content the advertising assets can be developed along with the content and the manual process described above may not be needed.

Creation of Reference File:

After the assets are identified and the after effects are determined, an image or reference file is created. Specifically, in example step 208 (FIG. 2A) a reference file is created that includes the original program content along with the location and after effects data relating to identified replaceable stage props/assets. The reference file is preferably time-based so that a video frame can reference the location of the stage props and the after effect settings according to the frame.

The reference file does not need to bundle the original program content. The original content may already be available to an end user for example on a DVD, HD, memory card. In these cases, a user may download or stream a reference file that contains the time-based stage-prop location and after effect data but does not contain original content. The present invention may also operate in a mode where the user reference file is provided, and the file itself contains the time-based stage-prop location and after effect data along with the replacement ad textures but no original content. The present invention may also operate in a mode where the user reference file is provided, and the file itself contains the time-based stage-prop location and after effect data along with the replacement ad textures and the original content.

As mentioned above, the image or reference file preferably includes time-based information that allows a player to recognize when replacement stage props are present in a scene, their profile, location and rendering settings.

Valuing the Impression for Each Asset:

In accordance with another embodiment of the present invention, there is provided a method of valuing the impression for each advertising asset. Specifically, in step 210 a value is determined and assigned to each dynamically replaceable stage prop/asset in the content. That is, for each asset, such as for example a green screen cereal box, there is provided a mechanism for qualifying or valuing the quality of the impression and for tracking qualities of the impression. Determining the value of each asset will help to influence the price to be paid by a potential advertiser.

The value of each asset can depend on many different factors. Such factors may include, but are not limited to, the size of the prop relative to the size of the screen, the amount of time that the prop is visible, the amount of clarity or blur effect that is applied to the prop, etc.

Regarding the amount of clarity or blur effect that is applied to the prop, a soda bottle, for example, may be way in the back of program and it might be kind of blurry. Because of the focal length of the camera the soda bottle may not be in focus, whereas the main character of the program is in focus. Thus, the amount of focus on the soda bottle is a factor. Because the soda bottle is somewhat blurry that might feed an impression formula that would value that advertising asset slightly less than if the soda bottle was right in front of the camera and in focus.

The amount of clarity or blur effect depends on whether the image needs to be blended or blurred in the after effect post process to blend it in with the rest of the material. This is identified in the manual process described above. In the case of the automated green screen prop process, the amount of clarity or blur effect may be automatically calculated based on the focal length of the camera, the type of lens, the distance to the prop, etc.

Another factor that can be used in valuing an asset can be whether a main character touches the asset or draws attention to it in some way. The position and orientation of the asset can also be a factor. For example, a soda bottle might be positioned at an angle that might devalue the asset because it is not at its proper orientation just by way of the artistic design. Such design choices in the creation of the content can have an impact on the exposure and thus the value.

The value of the assets is a balancing of the reality and the artistic freedom of a producer with the ability then to add value to those props and change them. Based on all the different factors potential advertisers can ultimately competitively bid for advertising on those assets, as will be discussed below.

Adding New Assets to Legacy Content:

In accordance with other embodiments of the present invention, new digital props/assets are inserted into legacy programs where no fixed prop previously existed. That is, dynamically replaceable stage props/assets are established in video, web, program content in blank, open or convenient locations. These embodiments help to solve the issue where legacy content may have limited opportunity for product/stage prop replacement.

Referring to FIGS. 3A, 3B, 3C, 3D, 3E and 3F, there are illustrated examples of how dynamically replaceable props/assets can be established in program content in accordance with such embodiments of the present invention. The program content may comprise a legacy program. Specifically, in FIG. 3A there is illustrated a scene 300 in a program that may include a character 302 standing next to a table 304. Unlike the scenario described above, there is no fixed stage prop on the table 304.

Figure 3A:
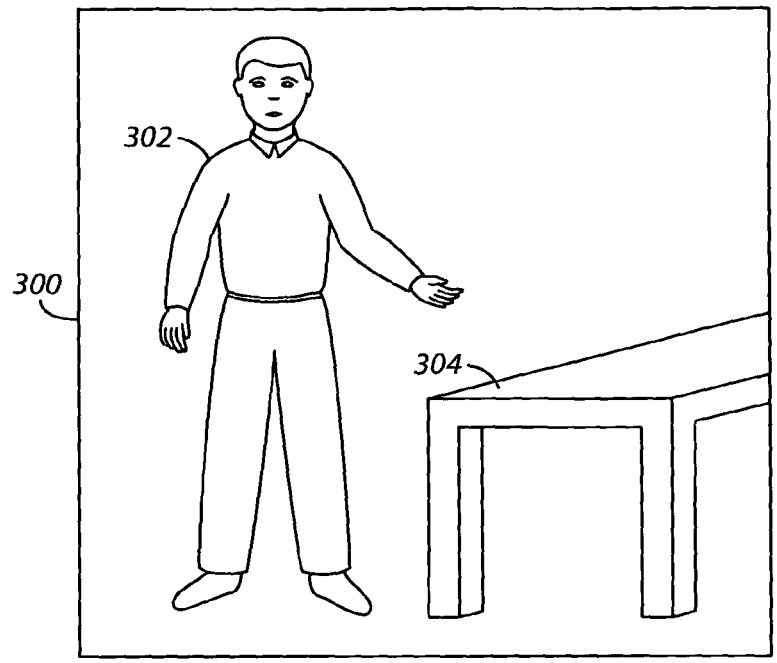
FIGS. 3A, 3B, 3C, 3D, 3E and 3F are example pictorial diagrams illustrating dynamically replaceable stage props/assets in accordance with embodiments of the present invention.
Figure 3B:
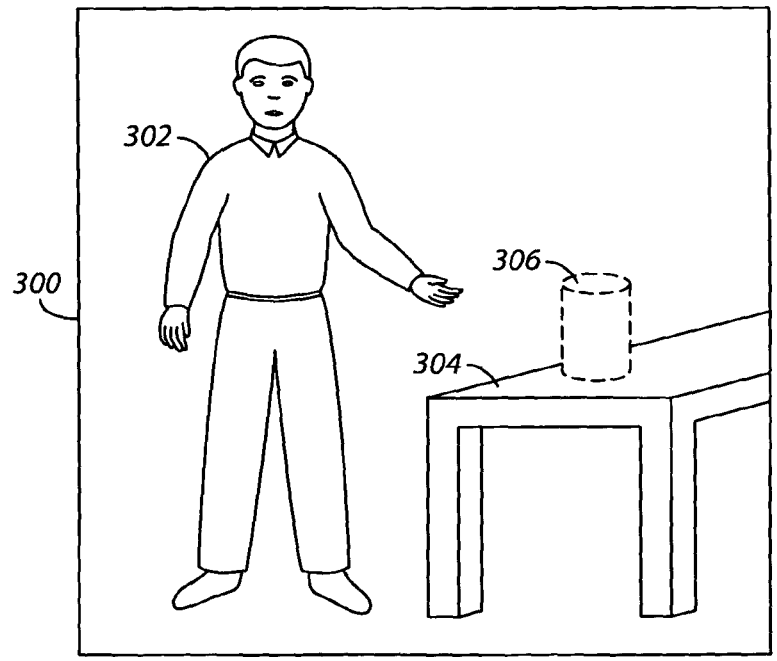
Figure 3C:
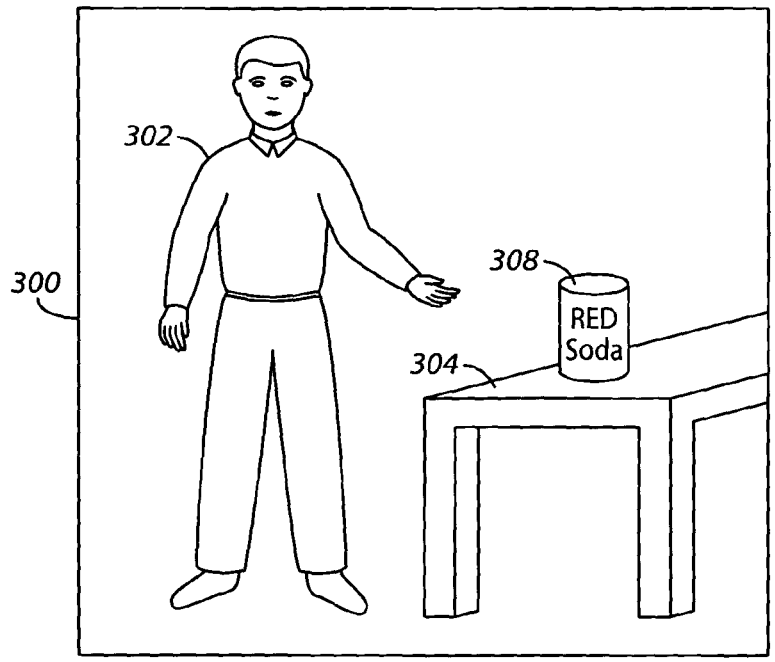
Figure 3D:
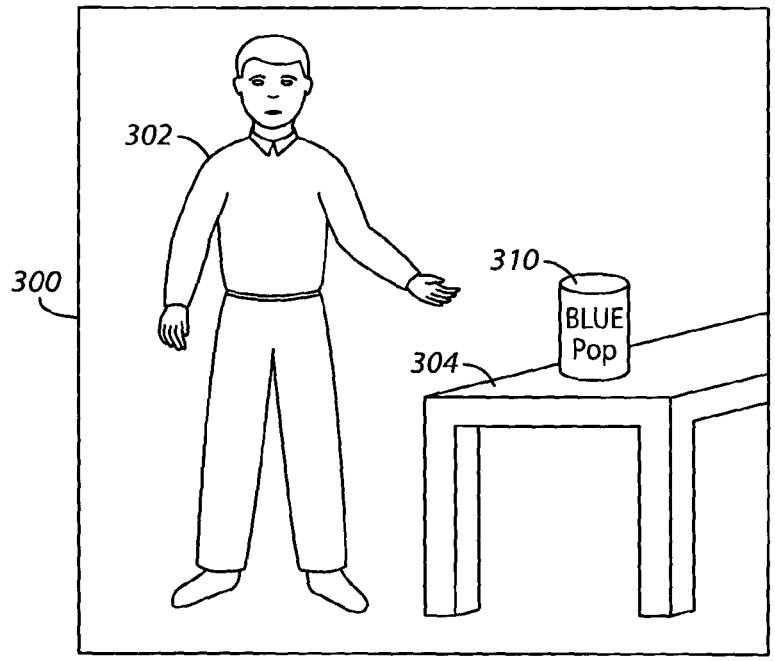

In FIG. 3B a dynamically replaceable stage prop/asset 306 representing a beverage can has been inserted into the scene 300 and positioned so that it is resting on the table 304. There was previously nothing shown on the table 304, so the insertion of the asset 306 makes valuable use of the previously blank space in this program.

The dynamically replaceable stage prop/asset 306 can now be sold to advertisers who want to insert their products into the program. For example, in FIG. 3C a brand of soda called "RED Soda" 308 has been inserted into the asset 306 in the scene 300. The program could be run for a period of time while the suppliers of "RED Soda" pay for this advertising opportunity. Then later, a different advertiser may want to pay to have their product displayed in the asset 306. For example, in FIG. 3D a different product, namely "BLUE Pop" 310, has been inserted into the asset 306 in the scene 300. The suppliers of "BLUE Pop" may pay to have their product displayed for a certain period of time while the program is rerun, such as for example just one episode or possibly a whole season or more.

Figure 3E:
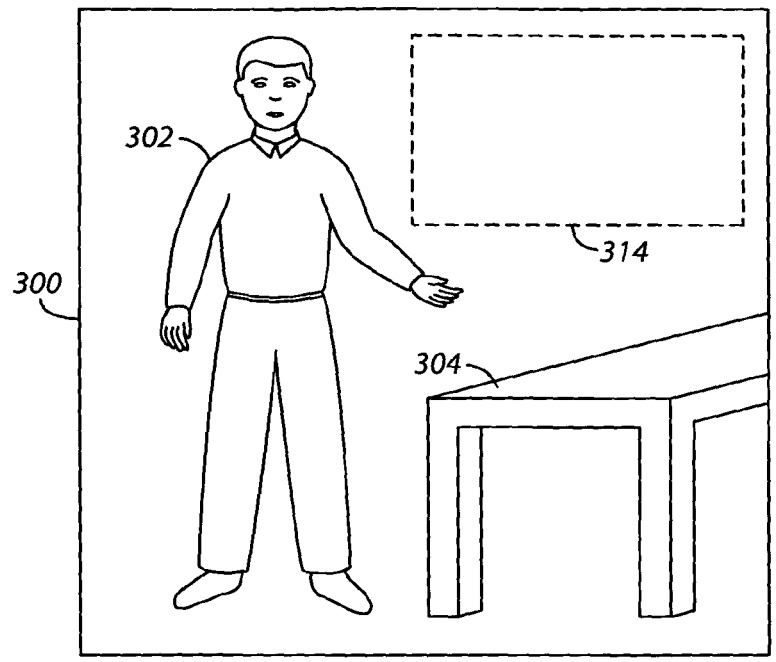
Figure 3F:
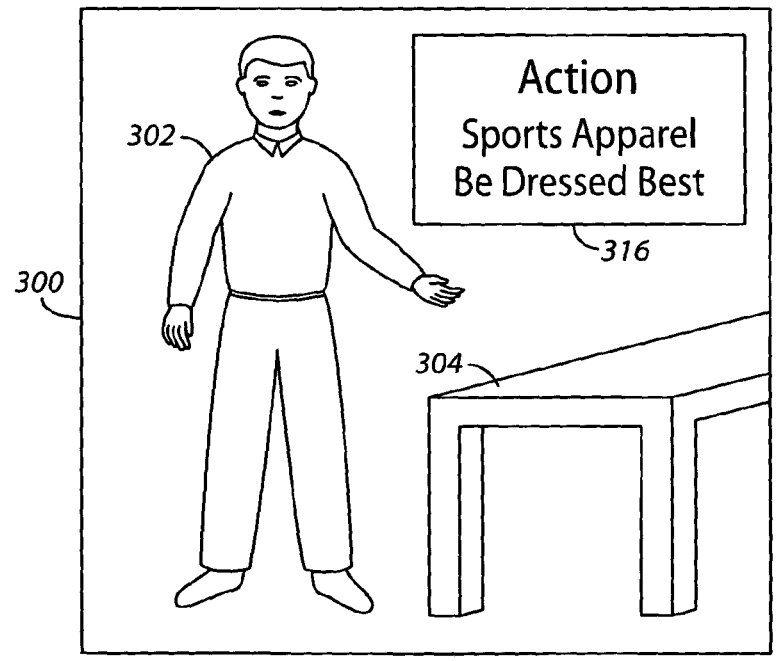

FIG. 3E illustrates that a dynamically replaceable stage prop/asset 314 representing a picture or poster can has been inserted into the scene 300 and positioned above the table 304. There was previously nothing shown on the wall, so the insertion of the asset 314 makes valuable use of the previously blank space. This dynamically replaceable stage prop/asset 314 can also be sold to advertisers who want to insert their message into the program. For example, in FIG. 3F a message regarding a brand of apparel called "Action Sports Apparel" 316 has been inserted into the asset 314 in the scene 300. In this way new props/assets can be added, such as for example pictures on blank walls where the pictures contain some ad-affinity, brand, etc.

Therefore, in these embodiments of the present invention new dynamically replaceable stage props/assets are added to the program in open or convenient locations. For example, if there is no cereal box in the original scene in the legacy program, one can be added into the scene.

Figure 4:
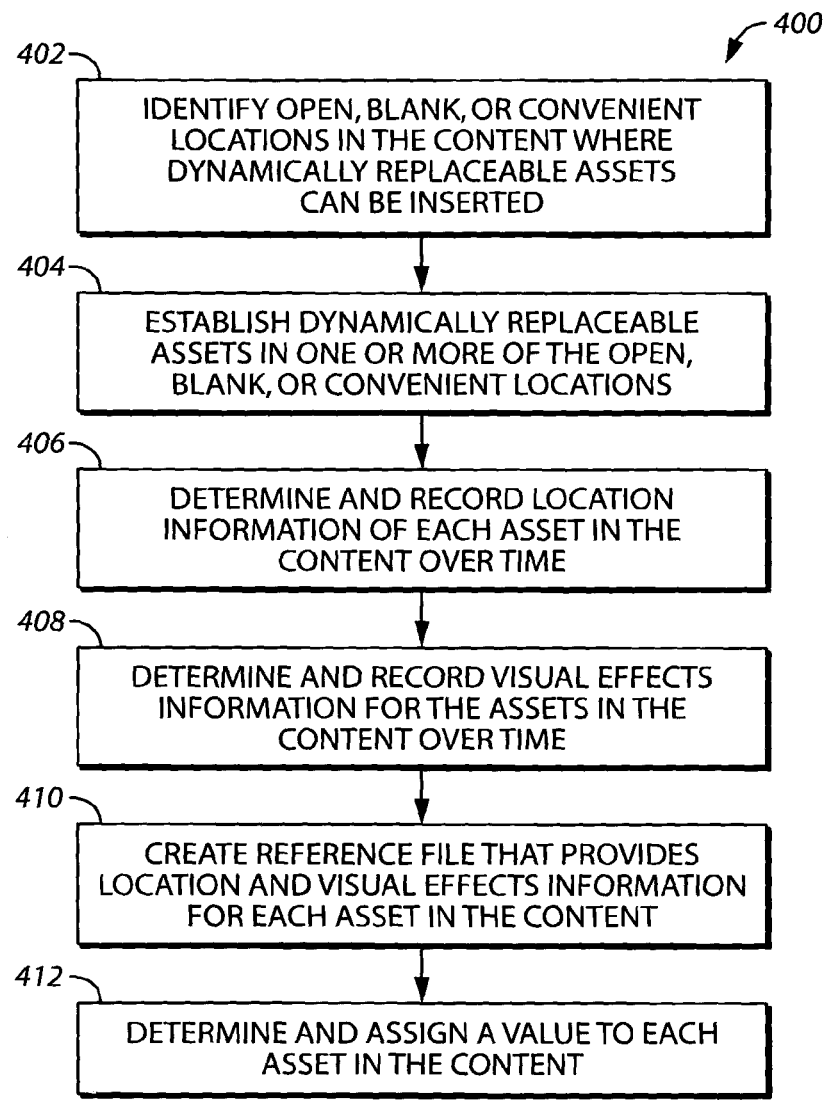
FIG. 4 is a flow diagram illustrating a method for creating content with dynamically replaceable stage props/assets in accordance with an embodiment of the present invention.

Referring to FIG. 4, there is illustrated a method 400 of adding new dynamically replaceable stage props/assets to program content in accordance with an embodiment of the present invention. In step 402 open, blank, or convenient locations in the content where dynamically replaceable assets can or are desired to be inserted are identified. In step 404 dynamically replaceable assets are established in one or more of the identified locations.

The above-described steps of saving location and visual effects information for the added assets can also be applied here where a new asset is inserted. Thus, in step 406 location information, such as the referential coordinates, for each new asset in the content is determined and recorded for each instant of time. Similarly, the processes of recording visual effects information and blending after effects can also be used. Therefore, in step 408 visual effects information of each asset in the content is determined and recorded for each instant of time. With respect to blending after effects and visual effects information, because there was no original fixed prop in the program, such blending will be to make the best fit and look with the rest of the scene.

In step 410, similar to as described above, a reference file is created that includes the original program content along with the dynamically replaceable stage props/assets. And in step 412 a value is determined and assigned to each dynamically replaceable stage prop/asset in the content.

Figure 5:
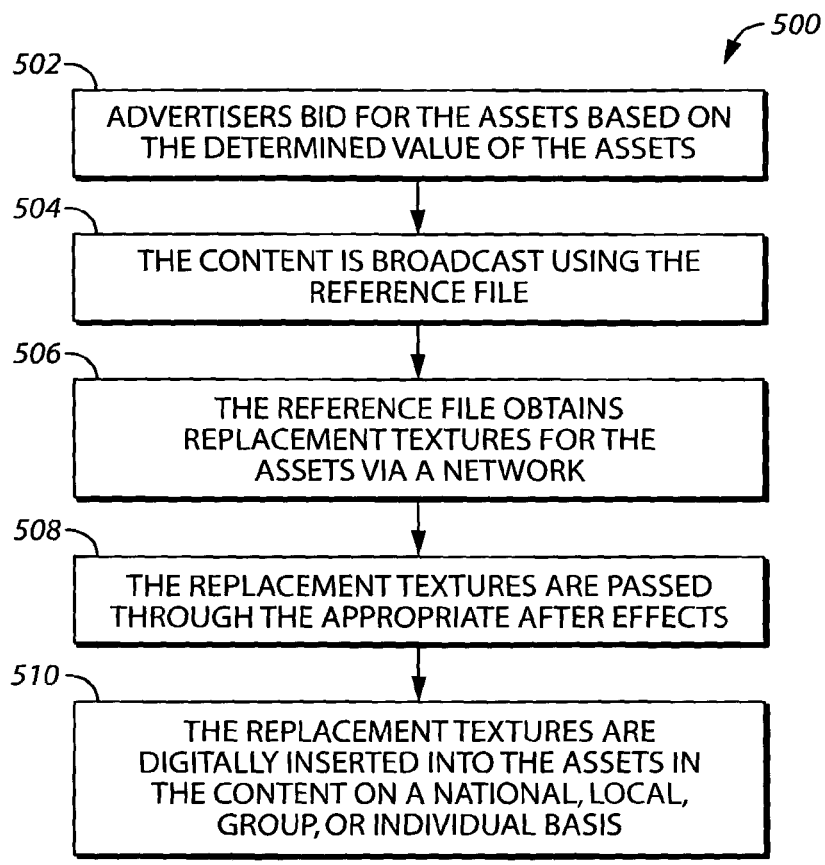
FIG. 5 is a flow diagram illustrating one method for playing back content with dynamically replaceable stage props/assets in accordance with an embodiment of the present invention.

Playback, Insertion of Replacement Images, and Networking:

Referring to FIG. 5, there is illustrated one example method 500 of playing back program content having dynamically replaceable stage props/assets in accordance with an embodiment of the present invention.

When the reference file is ultimately played back such as by downloading a TV show or playing a movie, it must be decided what replacement images will be inserted into the dynamically replaceable stage props/assets. Many schemes exist to allocate advertisement objects to the replacement props. Ads may have weights and a system may allocate ads to appropriate the genre or specific titles to accommodate requested number of impressions sought by an advertiser, etc.

Based on all the different factors potential advertisers can ultimately competitively bid for advertising in the assets. Thus, in step 502 of the method 500 advertisers bid for the assets. Such bidding may be based on the determined value of the assets.

There are many different ways such bidding can be done, such as for example by an auction or the like where the bidders are presented the program content and the types of assets available. For example, if one of the assets is a cereal box, then companies wanting to advertise cereal will bid for that particular show and asset.

Once it is decided what replacement images will be inserted into the dynamically replaceable stage props/assets, in this example, the content can then be broadcast using the reference file, as is indicated by the example step 504. As described above, in the present example, the image or reference file includes the program content as well as a function that for each instant of time provides the location and visual effects information for each dynamically replaceable stage prop/asset. As the program is played the reference file provides the referential coordinates of the location of each asset and the after affects that have to be applied to a new texture that is dynamically retrieved from a storage means using communications methods known in the art.

In step 506 of the example method the reference file obtains replacement images, objects or textures for the assets via a network. More specifically, when the media is played back the reference file will communicate with a network server and accept a new image, object or texture for each ID. Such IDs identify the dynamically replaceable stage props/assets.

In step 508 the replacement textures are passed through the appropriate after effects for each asset in the content. After the new textures are passed through the appropriate after affects they are merged into the content. This is illustrated by step 510 in which the replacement textures are digitally inserted into the assets in the content on a national, local, group, or individual basis. That is, the completed media is created by downloading the image of the replacement prop and digitally inserting the prop into the content.

The network server may comprise an advertisement server. Images of the replacement props are dynamically served from the ad server. Existing ad servers used for advertising in video games in entertainment systems may be modified for this purpose. Namely, such existing ad servers dynamically serve ads into billboards in video games. That infrastructure may be configured to dynamically serve the replacement props into the assets identified in the content.

Figure 6:
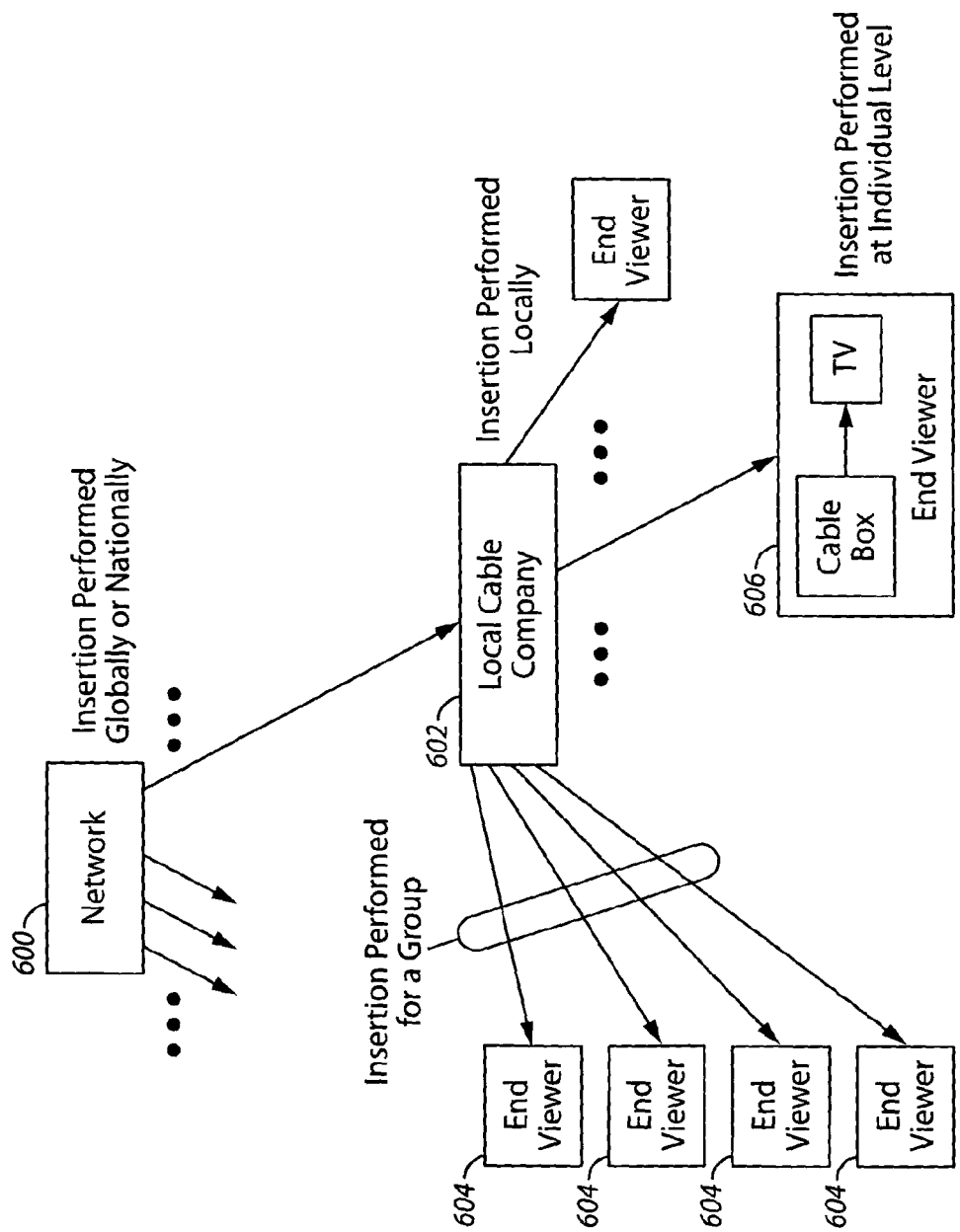
FIG. 6 is a system diagram illustrating an example implementation of a portion of the method shown in FIG. 5 in accordance with an embodiment of the present invention.

Step 510 provides that the replacement textures are digitally inserted into the content on a national, local, group, or individual basis. FIG. 6 illustrates an example of how this can be done in accordance with an embodiment of the present invention. Namely, a network 600 provides the program content to a number of cable companies, such as the cable company 602. The replacement prop insertion may be done iteratively, nationally or globally by the network 600 such that the same or mixed bundle replacement props appear in all local broadcasts. Alternatively, for programs that are broadcast nationally or globally, different replacement props and commercial textures may be inserted into the content in different local areas. For example, the replacement prop insertion may be done by local cable companies or local syndicates. The local cable company 602 may insert the same prop that is inserted nationally, or a prop having local significance may be inserted.

In another embodiment, different replacement props and commercial textures may be inserted into the content depending on a type or group of viewers. For example, one or more textures may be inserted for only the end viewers 604. In other embodiments, different replacement props and commercial textures may be inserted into the content for only a specific, individual viewer. An example of this scenario is illustrated for the end viewer 606 where the ad insertion is performed by the viewer's cable box, entertainment system, or the like. The program content can be downloaded to the viewer's cable box or entertainment system and then the ad insertion performed.

Profiling can be used for the scenario where the replacement prop depends on the type of viewer. Such profiling can utilize a user profile for each viewer. For example, for viewers that are hockey fans, they might see hockey props in the program content. Thus, the props and the style of the props are dependent on the profile of the user.

Therefore, there are many different ways that the network can flow the ads into the media.

Figure 7:
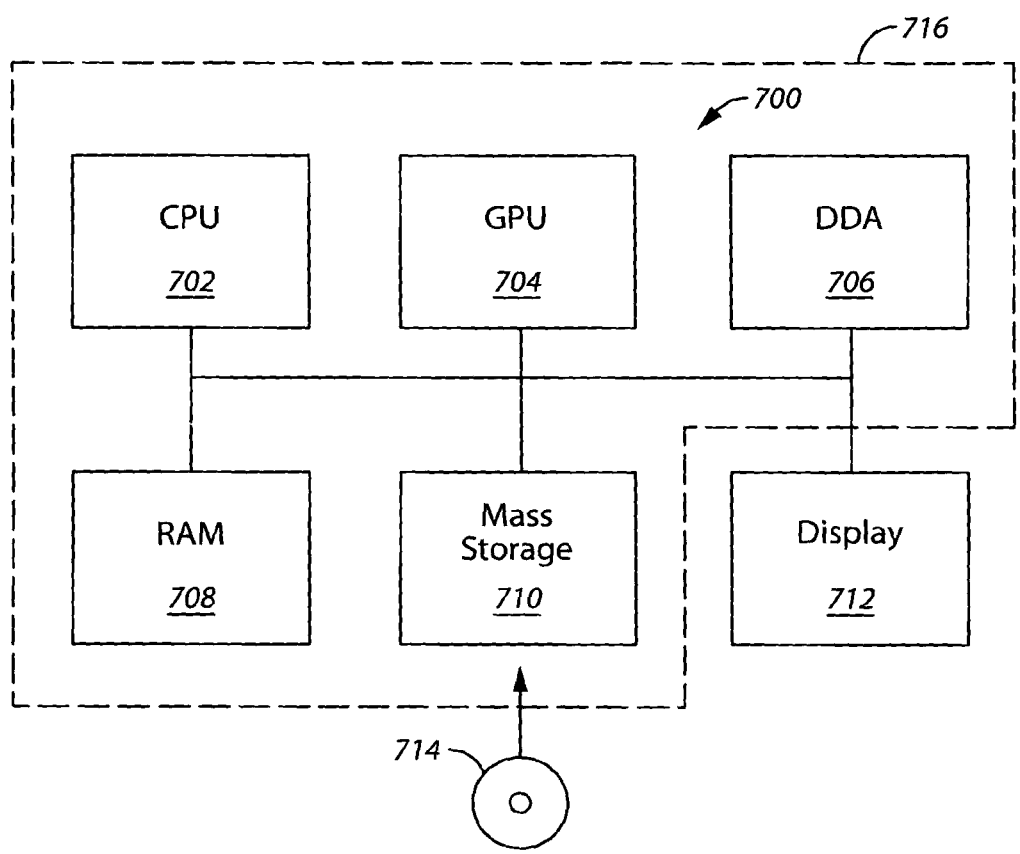
FIG. 7 is a block diagram illustrating a computer system that may be used to run, implement and/or execute the methods shown and described herein in accordance with embodiments of the present invention.

The methods and techniques described herein may be utilized, implemented and/or run on many different types of computers, graphics workstations, video game systems, DVD players, DVRs, media players, home servers, video game consoles, cell phones, portable devices, wireless devices and the like. Referring to FIG. 7 there is illustrated such a system 700 that may be used to implement and/or run the methods and techniques described herein. The system 700 includes a central processing unit (CPU) 702, a graphics processing unit (GPU) 704, digital differential analysis (DDA) hardware 706, a random access memory (RAM) 708, a mass storage unit 710, such as a disk drive, and a display monitor 712.

The CPU 702 and/or GPU 704 can be used to execute the steps of the methods and techniques described herein, and the various program content and images can be rendered on the display monitor 712. Removable storage media 714 may optionally be used with the mass storage unit 710, which may be used for storing code that implements the methods and techniques described herein. However, any of the storage devices, such as the RAM 708 or mass storage unit 710, may be used for storing such code. Either all or a portion of the system 700 may be embodied in a device 716, such as for example a computer or video game console or system. Simulations and/or processing may be run concurrently with other graphics tasks. On a multi processing core, simulations can be executed on a separate processor.

While the invention herein disclosed has been described by means of specific embodiments, examples and applications thereof, numerous modifications and variations could be made thereto by those skilled in the art without departing from the scope of the invention set forth in the claims. For example, the replacement images may be received over a network or through some other means, including DVD, memory card, etc. Ad textures and replacement images may include a model, image or combination(s). Program content and reference file may be streamed. The original program content may include the original program content and/or a modified encoded version of the original program content. The present invention may also be used to insert or replace stage props in traditional commercial advertisements themselves. The present invention can be used for a variety of purposes, including new video immersive game and entertainment models, messages, controls, tickers, news, frames are immersively placed and optimized for time-based scene specific placement, etc. The present invention may be used to insert or replace props in commercial banner ads placed in traditional distribution channels, including broadcast, web, network tv, games, etc. It should be well understood that 'content' may include, but is not limited to, television shows, programs, films, movies, videos, websites, commercials, documentaries, video games, etc.

The present invention may be configured to upload feedback records to track media use and user exposure to the advertisements. Ad models, textures may be buffered in storage on a device having intermitted network access. Ads may be placed on rotation schedules. The reference file may be one or more files and contain other elements and objects and location data and after effect data may be separated in physically different files or streamed over a network over different channels—this is still referred to as "reference file". The present invention may be used on portable devices, cell phones, etc.

Therefore, in some embodiments dynamically replaceable assets are inserted in program content and may be used for the insertion of cinematic stage props therein. Such assets can be used for advertising purposes in that images of different products and services can be inserted therein and are changeable via a network. Such assets may be created by identifying locations in the content where the assets can be inserted, establishing the assets in the identified locations, determining location and visual effects information for each asset, and creating a reference file that includes the location and the visual effects information associated with each asset. A value may be determined for each asset or advertisers may bid on the assets to yield additional advertising revenue channel for the content. The content may be played back by broadcasting the content and reference information designating parameters for inserting the assets into the content. Replacement images, such as images of products, may be obtained via a network. The visual appearance of each replacement image may be modified using visual effects information so the inserted objects appear natural as if they were part of the original scene.

What is claimed is:

1. A method, comprising:
   establishing a scene that is to be filmed for inclusion in content;
   placing a stage prop in the scene, wherein the stage prop comprises at least one charge-coupled device sensor (CCD);
   filming the scene;
   capturing scene information from the perspective of the stage prop during the filming of the scene using the at least one CCD in the stage prop;
   wherein the scene information comprises information regarding at least one of lighting of the stage prop, reflections of objects in the scene that reflect onto the stage prop, and shading of the stage prop; and
   using the scene information to configure visual effects information, wherein the visual effects information is configured to cause a replacement image for the stage prop to appear to include actual reflections from the scene when the replacement image is rendered with the visual effects information.

2. A method in accordance with claim 1, wherein the scene information comprises information regarding at least two of lighting of the stage prop, reflections of objects in the scene that reflect onto the stage prop, and shading of the stage prop.

3. A method in accordance with claim 1, wherein the scene information comprises information regarding all three of lighting of the stage prop, reflections of objects in the scene that reflect onto the stage prop, and shading of the stage prop.

4. A method in accordance with claim 1, wherein the information regarding lighting of the stage prop comprises information regarding at least one of the location of a light source, the type of light source, the intensity of a light source, and the color of a light source.

5. A method in accordance with claim 1, wherein the capturing scene information comprises capturing time-based scene information.

6. A method in accordance with claim 1, further comprising:
   the stage prop transmitting the scene information.

7. A method in accordance with claim 1, further comprising:
   tracking the stage prop during the filming of the scene; and
   determining location information for the stage prop based on the tracking of the stage prop.

8. A method in accordance with claim 7, wherein the tracking comprises machine vision tracking.

9. A method in accordance with claim 1, further comprising:
   tracking the stage prop during the filming of the scene; and
   determining position information for the stage prop based on the tracking of the stage prop.

10. A method in accordance with claim 9, wherein the position information comprises at least one of orientation, tilt, yawl, and roll metrics.

11. A method in accordance with claim 1, further comprising:
    after the filming of the scene is complete, inserting the replacement image into the content onto a filmed image of the stage prop to change an appearance of the stage prop.

12. A method in accordance with claim 11, further comprising:
    modifying a visual appearance of the replacement image using the visual effects information.

13. A method in accordance with claim 12, wherein the modifying a visual appearance of the replacement image using the visual effects information comprises:
    rendering the replacement image with the visual effects information.

14. A system, comprising:
    a stage prop that includes at least one charge-coupled device sensor (CCD); and
    a processor based apparatus that is configured to execute steps comprising,
       using the at least one CCD in the stage prop to capture scene information from the perspective of the stage prop during filming of a scene, and
       using the scene information to configure visual effects information associated with the stage prop;
    wherein the visual effects information is configured to cause a replacement image for the stage prop to appear to include actual reflections from the scene when the replacement image is rendered with the visual effects information; and
    wherein the scene information comprises information regarding at least one of lighting of the stage prop, reflections of objects in the scene that reflect onto the stage prop, and shading of the stage prop.

15. A system in accordance with claim 14, wherein the scene information comprises information regarding at least two of lighting of the stage prop, reflections of objects in the scene that reflect onto the stage prop, and shading of the stage prop.

16. A system in accordance with claim 14, wherein the scene information comprises information regarding all three of lighting of the stage prop, reflections of objects in the scene that reflect onto the stage prop, and shading of the stage prop.

17. A system in accordance with claim 14, wherein the information regarding lighting of the stage prop comprises information regarding at least one of the location of a light source, the type of light source, the intensity of a light source, and the color of a light source.

18. A system in accordance with claim 14, wherein the capturing scene information comprises capturing time-based scene information.

19. A system in accordance with claim 14, wherein the stage prop is configured to transmit the scene information.

20. A system in accordance with claim 14, wherein the processor based apparatus is further configured to execute steps comprising:
    tracking the stage prop during the filming of the scene; and
    determining location information for the stage prop based on the tracking of the stage prop.

21. A system in accordance with claim 20, wherein the tracking comprises machine vision tracking.

22. A system in accordance with claim 14, wherein the processor based apparatus is further configured to execute steps comprising:
    tracking the stage prop during the filming of the scene; and
    determining position information for the stage prop based on the tracking of the stage prop.

23. A system in accordance with claim 22, wherein the position information comprises at least one of orientation, tilt, yawl, and roll metrics.

24. A system in accordance with claim 14, wherein:
    the scene is included in content; and
    the processor based apparatus is further configured to execute steps comprising inserting the replacement image into the content onto a filmed image of the stage prop to change an appearance of the stage prop.

25. A system in accordance with claim 24, wherein the processor based apparatus is further configured to execute steps comprising:
  modifying a visual appearance of the replacement image using the visual effects information.

26. A system in accordance with claim 25, wherein the modifying a visual appearance of the replacement image using the visual effects information comprises:
  rendering the replacement image with the visual effects information.

27. A method, comprising:
  establishing a scene that is to be filmed for inclusion in content;
  placing a stage prop in the scene, wherein the stage prop comprises at least one sensor;
  filming the scene;
  capturing scene information from the perspective of the stage prop during the filming of the scene using the at least one sensor in the stage prop; and
  using the scene information to configure visual effects information, wherein the visual effects information is configured to cause a replacement image for the stage prop to appear to include visual qualities from the scene when the replacement image is rendered with the visual effects information.

28. A method in accordance with claim 27, wherein the scene information comprises information regarding at least one of lighting of the stage prop, reflections of objects in the scene that reflect onto the stage prop, and shading of the stage prop.

29. A method in accordance with claim 27, further comprising:
  the stage prop transmitting the scene information.

30. A method in accordance with claim 27, further comprising:
  tracking the stage prop during the filming of the scene.

31. A system, comprising:
  a stage prop that includes at least one sensor; and
  a processor based apparatus that is configured to execute steps comprising,
    using the at least one sensor in the stage prop to capture scene information from the perspective of the stage prop during filming of a scene, and
    using the scene information to configure visual effects information associated with the stage prop;
    wherein the visual effects information is configured to cause a replacement image for the stage prop to appear to include visual qualities from the scene when the replacement image is rendered with the visual effects information.

32. A system in accordance with claim 31, wherein the scene information comprises information regarding at least one of lighting of the stage prop, reflections of objects in the scene that reflect onto the stage prop, and shading of the stage prop.

33. A system in accordance with claim 31, wherein the stage prop is configured to transmit the scene information.

34. A system in accordance with claim 31, wherein the processor based apparatus is further configured to execute steps comprising:
  tracking the stage prop during the filming of the scene.

* * * * *